(12) United States Patent
Liu et al.

(10) Patent No.: US 10,853,245 B2
(45) Date of Patent: *Dec. 1, 2020

(54) EFFICIENT DATA UNIT REUSE METHOD AND SYSTEM

(71) Applicant: Advanced New Technologies Co., Ltd., George Town (KY)

(72) Inventors: Hao Liu, Beijing (CN); Mingqiang Zhuang, Zhejiang (CN); Zhenkun Yang, Beijing (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,553

(22) Filed: Jan. 30, 2020

(65) Prior Publication Data
US 2020/0174925 A1 Jun. 4, 2020

Related U.S. Application Data

(63) Continuation of application No. 16/698,118, filed on Nov. 27, 2019.

(30) Foreign Application Priority Data

Dec. 3, 2018 (CN) .......................... 2018 1 1468470

(51) Int. Cl.
*G06F 12/06* (2006.01)
(52) U.S. Cl.
CPC ...... *G06F 12/06* (2013.01); *G06F 2212/1044* (2013.01)

(58) Field of Classification Search
CPC ...................................................... G06F 3/064
See application file for complete search history.

(56) References Cited

U.S. PATENT DOCUMENTS

| 2005/0206975 | A1  | 9/2005  | Funazaki |
| 2009/0265403 | A1* | 10/2009 | Fukumoto ........... G06F 12/0246 |
| 2015/0278231 | A1  | 10/2015 | Bondada et al. |
| 2017/0357667 | A1  | 12/2017 | Auch et al. |
| 2018/0196609 | A1  | 7/2018  | Niesen |

OTHER PUBLICATIONS

International Search Report and Written Opinion dated Nov. 27, 2019, in counterpart International Application No. PCT/US2019/063541.

* cited by examiner

*Primary Examiner* — Gary W. Cygiel
(74) *Attorney, Agent, or Firm* — Finnegan, Henderson, Farabow, Garrett & Dunner, L.L.P.

(57) ABSTRACT

The present disclosure relates to a data unit reuse method, where data is stored in a data unit in the form of a data block and the data block has a block ID. The method includes: successively reading each data block in a current data unit to search for a first specific data block whose block ID does not conform to a predetermined order; determining whether at least one data block whose block ID conforms to the predetermined order exists after the specific data block in the current data unit; when it exists, determining that the current data unit has been damaged, and when it does not exist, determining that a data block immediately previous to the specific data block is a data end.

20 Claims, 7 Drawing Sheets

EFFICIENT DATA UNIT REUSE METHOD AND SYSTEM

CROSS-REFERENCE TO RELATED APPLICATIONS

This application is a continuation of U.S. application Ser. No. 16/698,118, filed on Nov. 27, 2019, which is based upon and claims priority to Chinese Patent Application No. 201811468470.5, filed on Dec. 3, 2018, the entire content of both of which is incorporated herein by reference.

TECHNICAL FIELD

The present application relates to computer technologies, and in particular, to a method and system for reuse of a data unit.

BACKGROUND

During data reading/writing (for example, file reading/writing), especially during reading/writing of a log, a database, or a data file, it is usually needed to solve the problem of how to reuse an old recyclable data unit in writing. In a file reading-writing case, for example, a file reading-writing solution in the prior art may be not to reuse an old file but to create a new file each time as required. In this solution, in order to guarantee that metadata of a file system is successfully written into a disk in an append writing operation, synchronization (SYNC), such as mutex locks, reading-writing locks, traffic lights, etc., usually needs to be performed in a writing operation. Moreover, an old file needs to be deleted if the disk space is insufficient, which may result in inefficient performance.

In another file reading-writing solution, an EOD (end of data) identifier is appended to an end of data each time of writing, to implement file reuse. In next time of writing, the file is searched for an EOD identifier and the found EOD identifier is used as an initial writing position, and the length of the EOD identifier is used as an offset. Then, a writing operation starts at a position offsetting forward from the initial writing position by the length of the EOD identifier, to overwrite the EOD identifier written last time. During file reading, if the EOD identifier is encountered, it indicates that the end of the file has been reached.

However, using an EOD identifier to identify the file end requires that data of a certain size needs to be additionally written in each writing operation. For example, according to different alignment requirements, data of 512 bytes or 4096 bytes needs to be additionally written, which increases the disk bandwidth. Furthermore, overwriting the EOD identifier by means of offsetting is not beneficial to, or even not supported by, a mechanical disk or a network file system only supporting the append writing operation.

In still another file reading-writing solution, the file content is first completely overwritten with invalid data before reuse of the old file. After completion of the writing, new content is written into the file.

However, overwriting the old file requires high IO overheads. In addition, overwriting greatly delays a writing operation requiring performing file switch.

SUMMARY

One aspect of the present disclosure provides a data unit reuse method, wherein data is stored in a data unit in the form of a data block and the data block has a block ID. The method includes: successively reading each data block in a current data unit to search for a first specific data block whose block ID does not conform to a predetermined order; determining whether at least one data block whose block ID conforms to the predetermined order exists after the specific data block in the current data unit; when at least one data block whose block ID conforms to the predetermined order exists after the specific data block in the current data unit, determining that the current data unit has been damaged, and when no data block whose block ID conforms to the predetermined order exists after the specific data block in the current data unit, determining that the data block immediately previous to the specific data block is a data end.

Another aspect of the present disclosure provides a data unit reuse method, which includes: acquiring a reusable data unit; renaming the reusable data unit with a new data unit name according to a predetermined order of data unit names; and writing a new data block into the reusable data unit according to a predetermined order of data block IDs.

Another aspect of the present disclosure provides a data unit reuse apparatus, wherein data is stored in a data unit in the form of a data block and the data block has a block ID. The apparatus includes: a memory; and a processor, coupled to the memory and configured to: successively read each data block in a current data unit to search for a first specific data block whose block ID does not conform to a predetermined order; determine whether at least one data block whose block ID conforms to the predetermined order exists after the specific data block in the current data unit; when at least one data block whose block ID conforms to the predetermined order exists after the specific data block in the current data unit, determine that the current data unit has been damaged, and when no data block whose block ID conforms to the predetermined order exists after the specific data block in the current data unit, determine that the data block immediately previous to the specific data block is a data end.

Another aspect of the present disclosure provides a data unit reuse apparatus. The apparatus includes: a memory; and a processor, coupled to the memory and configured to: acquire a reusable data unit; rename the reusable data unit with a new data unit name according to a predetermined order of data unit names; and write a new data block into the reusable data unit according to a predetermined order of data block IDs.

DETAILED DESCRIPTION

Embodiments of the specification are described in detail below with reference to the accompanying drawings. It should be noted that the described embodiments are examples rather than all of the embodiments consistent with the specification. Based on the described embodiments of the specification, other modified embodiments may be acquired by persons of ordinary skill in the art without creative effort and also belong to the protection scope of the specification.

Figure 1:
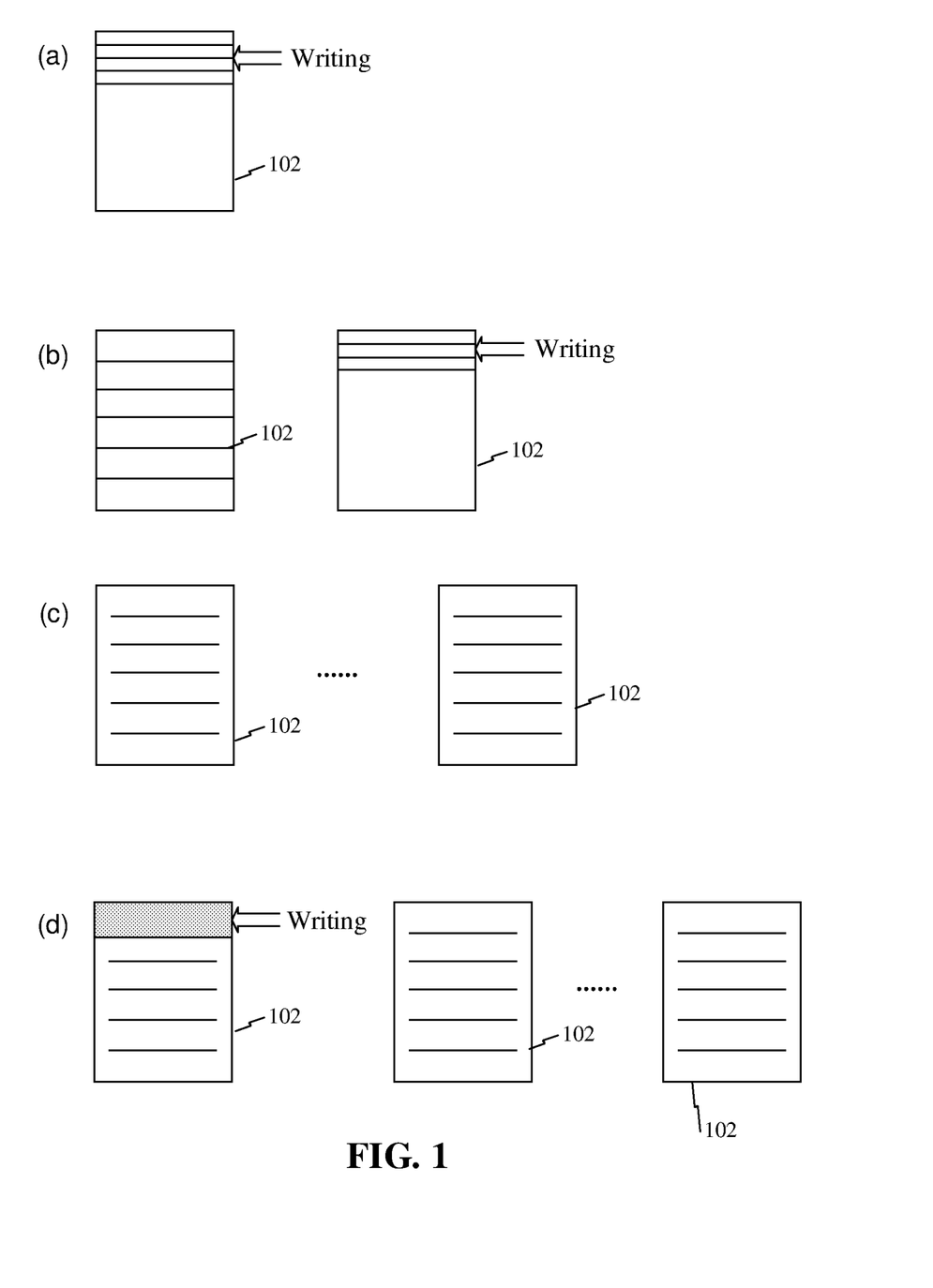
FIG. 1 is a schematic diagram of a use status of a recyclable data unit according to an embodiment.

FIG. 1 is a schematic diagram of a use status of a recyclable data unit according to an embodiment. For illustrative purpose, a file is used herein as an example of the recyclable data unit. However, persons of ordinary skill in the art should understand that any other recyclable data units of different sizes, forms, and formats are all applicable to the present disclosure. The recyclable data unit may be of a fixed or variable length. Referring to FIG. 1, in a status (a), a new data unit 102 is created and then data is written thereinto. In a status (b), it continues to write data until the data unit 102 is full, and then a next data unit 102 is created and data is written thereinto. Similarly, after a certain quantity of data units 102 are created and data is written thereinto, the capacity reaches an upper limit, as shown in a status (c). In this case, an old data unit needs to be reused, as shown in a status (d). In another case, the old data unit may be reused even when the capacity does not reach the upper limit (this case is not shown in the figure), so as to save storage resources.

In an embodiment, reuse of the data unit may start from, for example, the earliest data unit. However, because the old data unit has dirty data, a mechanism for differentiating new data from the dirty data may be used.

Figure 2:
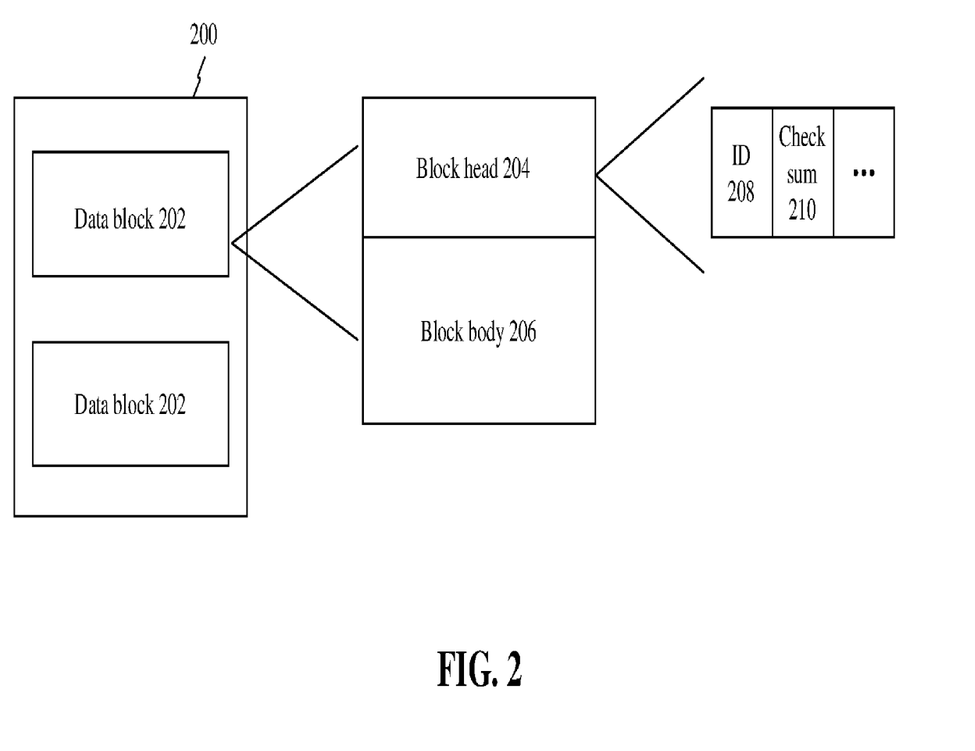
FIG. 2 is a schematic diagram of a data unit according to an embodiment.

FIG. 2 is a schematic diagram of a data unit 200 according to an embodiment. The data unit 200 may be a file, such as a log file, a database file, a data file, or the like. However, the present disclosure is not limited thereto, and other data units may also be applicable to the present disclosure.

The data unit 200 may store one or more data blocks 202 of a fixed or variable length. Each data block 202 may include a block head 204 and a block body 206, and the block head 204 may include metadata. In an embodiment, the block head 204 may at least include, for example, a block ID 208 and a block checksum 210. The block head 204 may also include other information. For example, when the data block 202 is of a variable length, the block head 204 may also include the number of bytes to be currently written (namely, the length of the block).

In an embodiment, as an identifier of the data block 202, the block ID 208 can uniquely identify the data block and conforms to a predetermined order. For example, the block ID 208 may be set to monotonically increasing or decreasing numbers. In an either increasing or decreasing order, adjacent block IDs may be continuous or discontinuous. For example, the block IDs may be correlated timestamps, continuously increasing/decreasing integers, or the like. The block checksum 210 may include a checksum of the current data block 202. For example, the block checksum 210 may include a complete checksum of the block head 208 and the block body 206. The block body 206 may include data, such as logs, data items, data, or the like. The block body 206 may include an aggregation of multiple data items, such as an aggregation of multiple logs, multiple pieces of data, or the like.

Figure 3:
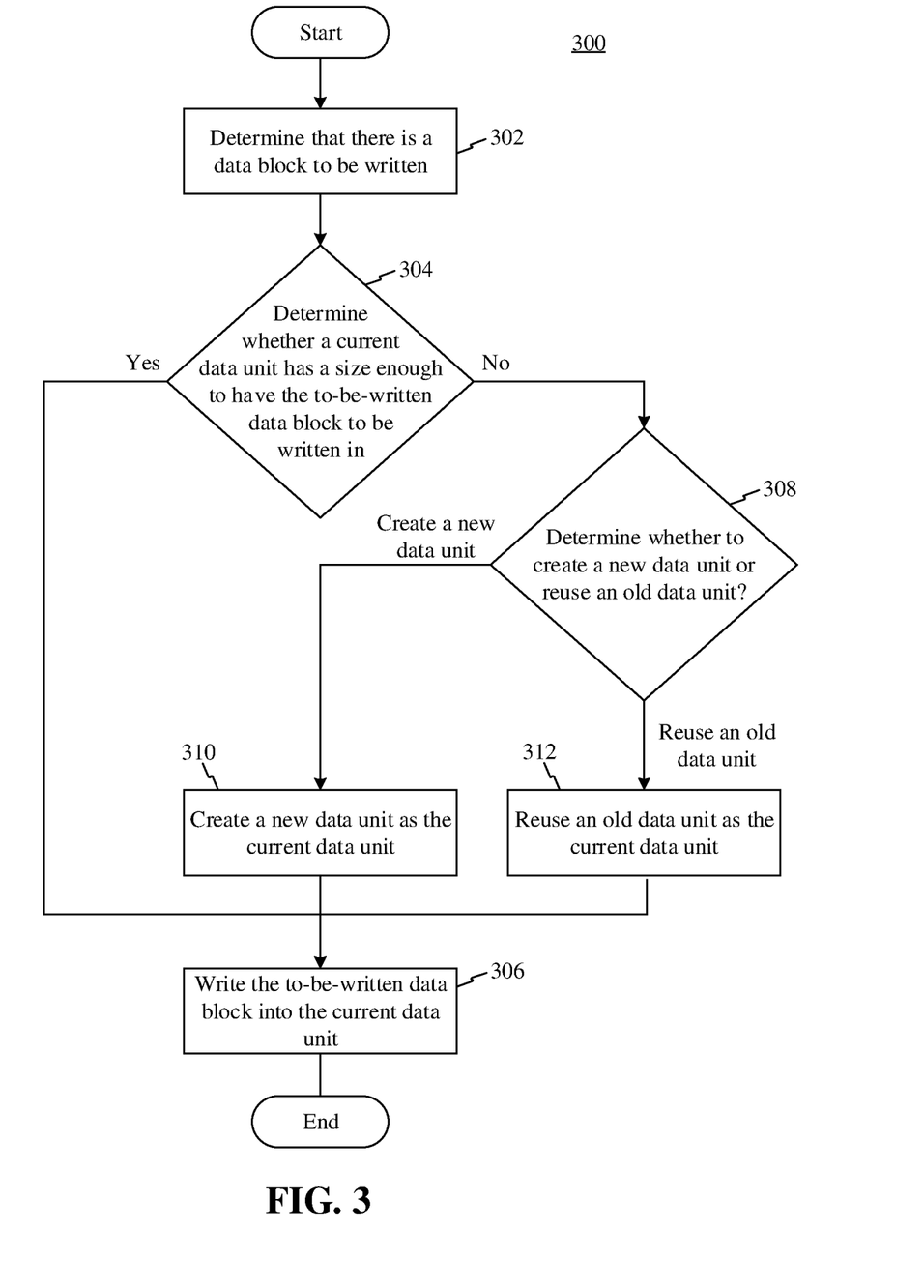
FIG. 3 is a flow chart of a method of writing into a recyclable data unit according to an embodiment.

FIG. 3 is a flow chart of a method 300 of writing into a recyclable data unit according to an embodiment. For example, this data unit may be the data unit 200 described in FIG. 2. The method 300 may include box 302: determining that there is a data block to be written. The data block may be referred to as, for example, a to-be-written data block. For example, for a log file, box 302 may include: determining that a log is to be written into the log file. For another example, for a database file, box 302 may include: determining that a data item is to be written into the database file. For still another example, for a data file, box 302 may include: determining that data is to be written into the data file. In the embodiment, the data block may be the data block 202 described in FIG. 2.

In box 304, it is determined whether a current data unit has a size enough to have the to-be-written data block to be written in. For example, if continuing to write the to-be-written data block in the current data unit after the last written data block does not cause exceeding the size limit of the current data unit, it can be determined that the current data unit has a size enough to have the to-be-written data block to be written in. Otherwise, it can be determined that the current data unit does not have a size enough to have the to-be-written data block to be written in. When it is determined that the current data unit has a size enough to have the to-be-written data block to be written in (that is, a judgment result of box 304 is "yes") in box 304, the method 300 goes to box 306. Otherwise, when it is determined that the current data unit does not have a size enough to have the to-be-written data block to be written in (that is, a judgment result of box 304 is "no") in box 304, the method 300 goes to box 308. In box 308 of the method 300, it is determined whether to create a new data unit or reuse an old data unit. This box may be implemented based on various factors. In an embodiment, it may be determined, based on different scenarios, user preferences, system settings, and the like, whether to create a new data unit or reuse an old data unit. For example, if the data units are expected to be retained as many as possible and/or as long as possible for future use such as archiving, a new data unit is preferably created. On the other hand, if it is only expected to keep the data units that must be retained to reduce the use of storage space, for example, if a disk is non-exclusive, old data units may be preferably reused. In an embodiment, when the total amount of data units has reached an upper limit, it is determined that an old data unit needs to be reused. Box 308 may be implemented based on a combination of various considerations.

When it is determined that a new data unit needs to be created in box 308, the method 300 goes to box 310: creating a new data unit as the current data unit. Then, the method 300 goes to box 306. On the other hand, when it is determined that an old data unit needs to be reused in box 308, the method 300 goes to box 312. In box 312 of the method 300, an old data unit is reused as the current data unit, which will be further described below. Then the method 300 goes to box 306, in which the to-be-written data block is written into the current data unit. The method 300 ends.

Figure 4:
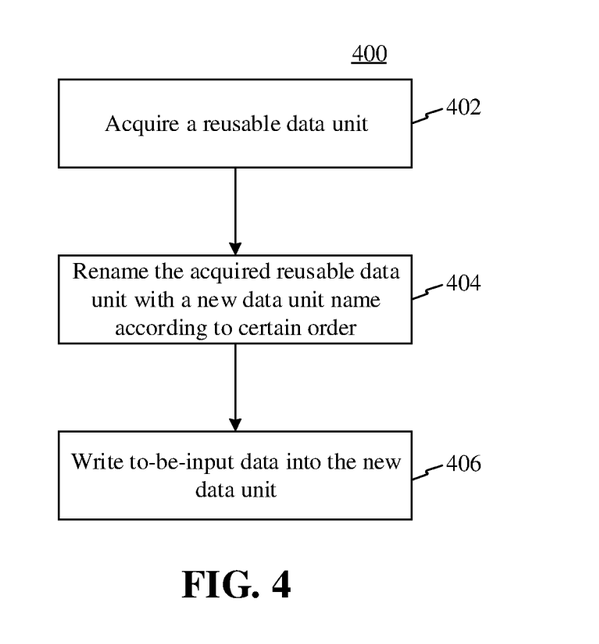
FIG. 4 is a flow chart of a method of writing into a reused old data unit according to an embodiment.

FIG. 4 is a flow chart of a method 400 of writing data into a reused old data unit according to an embodiment. The method 400 includes box 402: acquiring a reusable data unit. In an embodiment, the acquiring the reusable data unit may include acquiring the earliest (namely, the oldest) reusable data unit. For example, when the data unit is a file in a disk, the acquiring the earliest reusable data unit may include acquiring the earliest file from the disk. The acquiring the earliest file may be implemented by using various solutions. In an embodiment, file names may be generated in order when files are initially generated. For example, the file names (namely, file IDs) may be generated by using increasing numbers. The file names are not limited to the increasing numbers. For example, the file names may be generated in alphabetical or lexicographic order, or by using a combination of numbers and letters, provided that the files names are in order. Thus, the acquiring the earliest reusable file may be implemented by acquiring a file name ranking at the top in a corresponding sequence. For example, when the file names are generated by using increasing numbers, the earliest reusable file can be acquired by acquiring the smallest number among all the current file names.

Then, in box 404 of the method 400, the acquired earliest reusable data unit is renamed with a new data unit name (for example, a file name) according to a certain order. The renamed data unit can be used as a new data unit allowing writing in. Each time a data unit is reused, the data unit is renamed to guarantee that the data unit name conforms to a predetermined order. In an embodiment, the data unit names (for example, file names) may be formed by increasing or decreasing numbers. The numbers used as the data unit names may be continuous or discontinuous, but the present disclosure is not limited thereto. For example, the data unit names may be a combination of letters and numbers, provided that they conform to a predetermined order.

Then, in box 406: the method 400 includes writing to-be-written data into the new data unit (namely, the renamed data unit). In an embodiment, the data may be written into the data unit 200 described in FIG. 2 in the form of the data block 202 described in FIG. 2. For example, for a log file or a data file, multiple logs (or multiple pieces of data) may be aggregated into a data block, and the block may include a head portion. Referring to the foregoing description of the block head 204 in FIG. 2, the head portion of the block may include metadata. For example, the head portion of the block may include a block ID and check data, and reference is made to the block head 204 described in FIG. 2 that at least includes the block ID 208 and the block checksum 210 (and optionally includes other metadata). Each block may be of a fixed or variable length. For example, when the block (for example, a data block) is of a variable length, the head portion may also include the number of bytes to be currently written (namely, the length of the block). As an identifier of the block, the block ID can uniquely identify the block and conforms to a predetermined order. For example, the block IDs may be monotonically increasing or decreasing numbers, and reference may be made to the foregoing description of the block ID 208 in FIG. 2. In an either increasing or decreasing order, adjacent block IDs may be continuous or discontinuous. For example, the block IDs may be correlated timestamps, continuously increasing/decreasing integers, or the like. The check data may include a checksum of the current block, and reference may be made to the foregoing description of the block checksum 210 in FIG. 2. After the to-be-written data is written into the renamed data unit, the method 400 ends.

Figure 5:
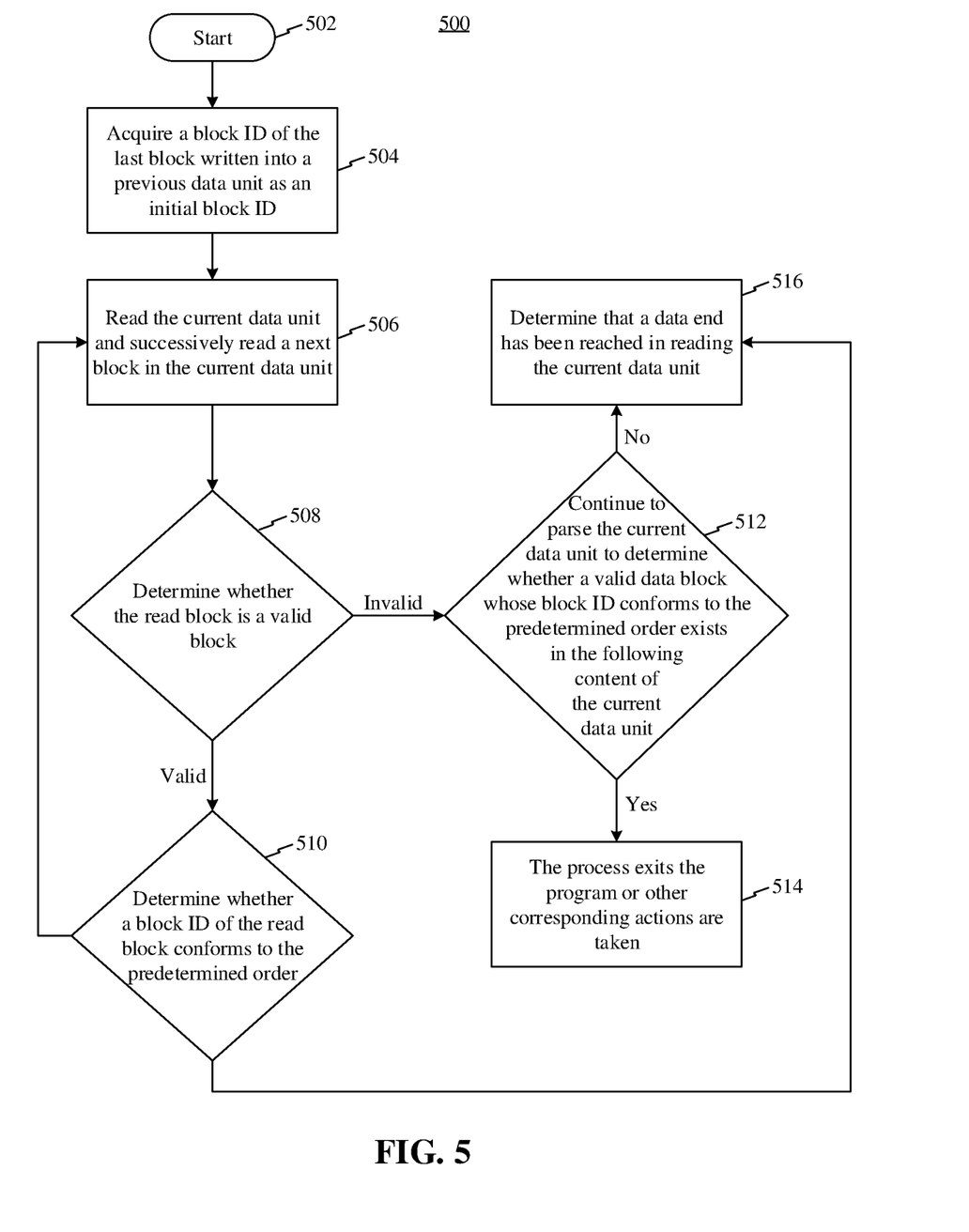
FIG. 5 is a flow chart of a method of determining a writable position in a current data unit according to an embodiment.

FIG. 5 is a flow chart of a method 500 of determining a writable position in a current data unit according to an embodiment. The determining the writable position in the current data unit generally includes determining an end position of the latest writing in. The method 500 starts from box 502. In box 504 of the method 500, a block ID of the last block written into the previous data unit is acquired as an initial block ID. In one embodiment, a value of this block ID may be acquired by reading the previous data unit. In another embodiment, each time a file is switched, the value of the block ID may be recorded in an external storage apparatus or another storage position, and acquired from the external storage apparatus or another storage position in restart. In box 506 of the method 500, the current data unit is read and a next block in the current data unit is successively read. The current data unit may be the currently latest data unit. In an embodiment, the currently latest data unit may be determined according to data unit names. For example, when the data unit names are increasing numbers, the currently latest data unit is a data unit having a data unit name of the currently largest number. The current data unit name may also be recorded in an external storage apparatus or another storage position each time the file is switched, and acquired from the external storage apparatus or another storage position in restart. In an embodiment, the current data unit may be read at a fixed length in an offset increasing direction. For example, for a block of a fixed length L, the reading the current data unit at a fixed length may include reading data of the length L in the current data unit each time successively. However, the present disclosure is not limited thereto. For example, the present disclosure is not limited to the reading at a fixed length. For a variable-length block, if the maximum length of the block is L, the reading the current data unit at a fixed length may include reading data of the length L in the current data unit each time successively, and then determining the length of a current block by parsing a head portion of the current block. Generally speaking, it is only required to guarantee that content read each time covers a head portion of a block to guarantee that the head portion of the block can be parsed.

In box 508, it is determined whether the read block is a valid block. In an embodiment, the determining whether the read block is a valid block includes checking a checksum in a head portion of the block. However, the present disclosure is not limited thereto, and other manners of determining whether the block is valid may also be applicable.

When the read block is determined as a valid block in box 508, the method 500 goes to box 510. In box 510 of the method 500, it is determined whether a block ID of the read block conforms to a predetermined order. For example, the determining whether a block ID of the read block conforms to a predetermined order may include determining whether the block ID of the read block increases (or decreases, which depends on system settings) as compared with that of the previous block. For example, an initial value of the block ID of the previous block may be set to the initial block ID acquired in box 504, namely, the block ID of the last block written into the previous data unit. If it is determined that the block ID of the read block increases (or decreases) as compared with that of the previous block, the method 500 returns to box 506 to read the next block. In an embodiment, the reading the next block may include successively parsing the next block in the current data unit in an offset increasing order. Specifically, parsing the next block includes parsing a head portion of the next block (and if required, including parsing the content contained in the block).

When the read block is determined as an invalid block in box 508, the method 500 goes to box 512. The determining the read block as an invalid block may include determining that a checksum in the head portion of the block fails to pass the check. In an embodiment, boxes 508 and 510 may be combined, and the method 500 goes to box 512 if an invalid block and/or a block whose block ID does not conform to the predetermined order is found.

In box 512 of the method 500, the current data unit is parsed to determine whether a valid data block whose block ID conforms to the predetermined order exists in the following content of the current data unit. In an embodiment, the determining whether the data block is valid may include checking the data block based on the checksum. In an embodiment, the determining whether the block ID of the data block conforms to the predetermined order may include determining whether the block ID of the data block increases (or decreases) as compared with a block ID of the previous block. For example, the method 500 may determine whether a block ID of each valid data block as parsed is smaller than a block ID of the previously read block from a file offset of the current block to the end (for example, the EOD) of the current data unit.

If a judgment result of box 512 is yes, it indicates that the current data unit has been damaged. For example, it indicates that the current data block in the current data unit probably has been damaged. Thus, the method 500 goes to box 514, in which the process exits the program or other corresponding actions are taken. If the judgment result of box 512 is no, the method 500 goes to box 516, in which it is determined that a data end (for example, the EOD) has been reached in reading of the current data unit.

In box 510 of the method 500, if it is determined that the block ID of the read block does not increase (or does not decrease, which depends on the system setting) as compared with that of the previous block, the method 500 goes to box 516, in which it is determined that the data end (for example, the EOD) has been reached in reading the current data unit. Information about the data end may be recorded in an external storage apparatus or another storage position, and acquired from the external storage apparatus or another storage position in restart, so as to read/write and reuse these data units more efficiently.

In an embodiment, if a fixed-length block is used, it is even not required to check the fixed-length block. That is, box 508 may be omitted, and boxes 510 and 512 may be combined. For example, it may be directly determined whether the block ID of the current block increases (or decreases), and the next block is read if the block ID of the current block increases (or decreases). If the block ID of the current block does not increase (or does not decrease), it is further determined whether a block whose block ID increases exists in the following content of the current data unit. If it exists, it is determined that the file has been damaged and corresponding processing is performed. If it does not exist, it is determined that the data end has been reached. Of course, the fixed-length block may also be checked by using the process described in FIG. 5 to achieve a better effect.

In the embodiments of the present disclosure, by reuse of a data unit, metadata in a file system does not need to be synchronized in writing, thus improving writing efficiency. In addition, based on a combination of increasing (or decreasing) block IDs and a checksum, it can eliminate the need to write an additional EOD field during each writing operation, it can also eliminate the need to perform overwriting, and it can avoid data loss and reading dirty data. The embodiments of the present disclosure can further accurately detect a damaged data unit.

Figure 6:
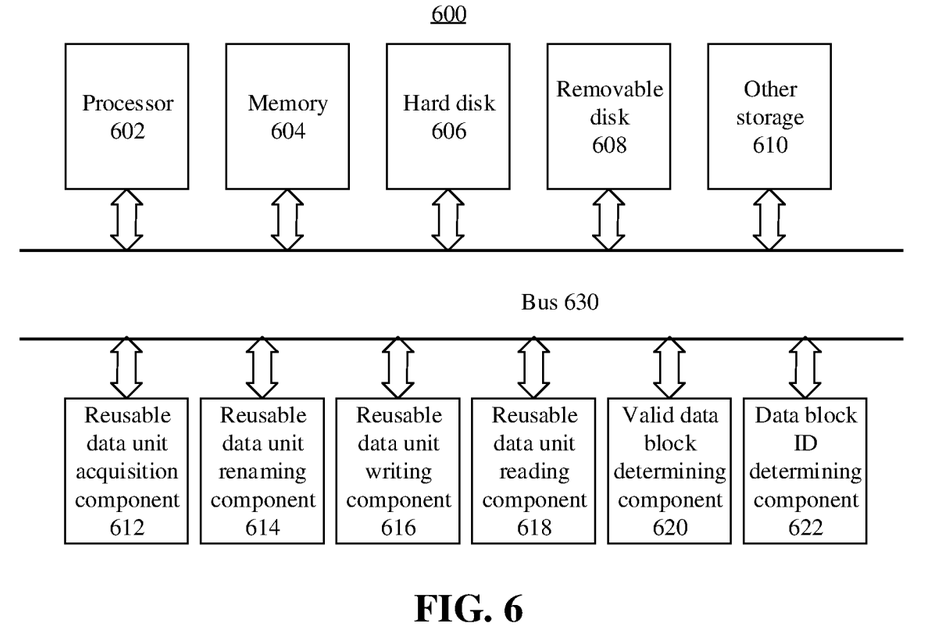
FIG. 6 is a schematic diagram of a data unit reuse system according to an embodiment.

FIG. 6 is a schematic diagram of a data unit reuse system 600 according to an embodiment. The system 600 may include a processor 602, a memory 604, a hard disk 606, a removable disk 608, and other storage 610. The system 600 may further include a reusable data unit acquisition component 612, a reusable data unit renaming component 614, a reusable data unit writing component 616, a reusable data unit reading component 618, a valid data block determining component 620, a data block ID determining component 622, and the like. These components may be coupled together with a bus 630 and mutually communicate.

In an embodiment, the reusable data unit acquisition component 612 can perform the operation described in box 402 in FIG. 4. The reusable data unit renaming component 614 can perform the operation described in box 404 in FIG. 4. The reusable data unit writing component 616 can perform the operation described in box 406 in FIG. 4. The reusable data unit reading component 618 can perform the operation described in box 506 in FIG. 5. The valid data block determining component 620 can perform the operation described in box 508 in FIG. 5. The data block ID determining component 622 can perform the operations described in boxes 504, 510 and 512 in FIG. 5. The processor 602 can be configured to perform the operations described in boxes 514 and 516 in FIG. 5.

In an embodiment, the reusable data unit acquisition component 612, the reusable data unit renaming component 614, the reusable data unit writing component 616, the reusable data unit reading component 618, the valid data block determining component 620, and the data block ID determining component 622 may be implemented by using different hardware, software, or firmware. For example, in hardware implementation, these components may be implemented by using a field-programmable gate array (FPGA), an application-specific integrated circuit (ASIC), a circuit, and the like. In software implementation, these components may be stored in the memory 604 of the system 600, and are executed by the processor 602. These components may also be implemented by using a combination of the above-described means, which all fall within the scope of the present disclosure.

Figure 7:
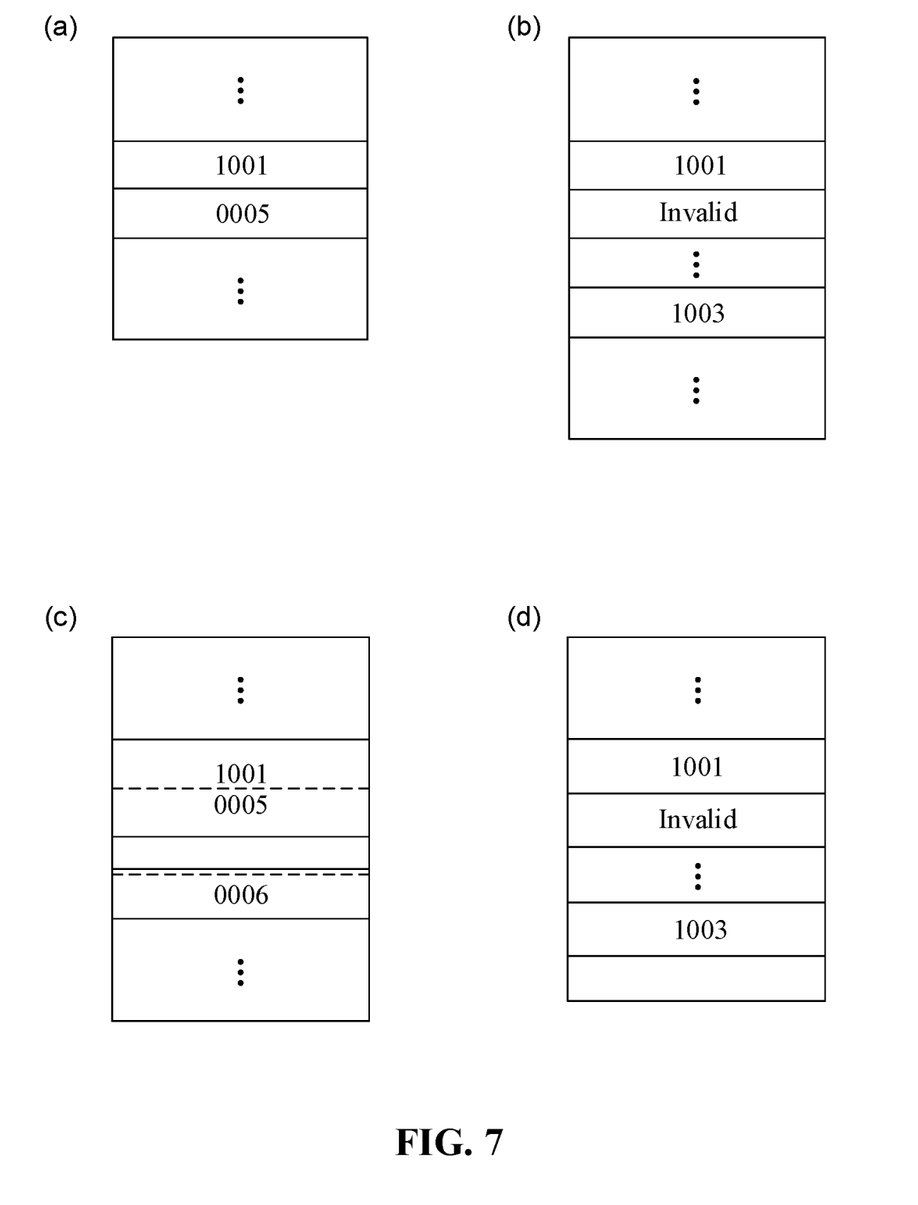
FIG. 7 is a schematic diagram of reading-writing cases of a reusable file according to an embodiment.

FIG. 7 is a schematic diagram of reading-writing cases of a reusable file according to an embodiment. FIG. 7(*a*) shows a case in which data blocks are of a fixed length and there is no damaged data block. FIG. 7(*b*) shows a case in which data blocks are of a fixed length and there is a damaged data block. FIG. 7(*c*) shows a case in which data blocks are of variable lengths and there is no damaged data block. FIG. 7(*d*) shows a case in which data blocks are of variable lengths and there is a damaged data block.

For the case (a) in which data blocks are of a fixed length and there is no damaged data block, when data blocks in the file are successively read until a data block 1001, these read data blocks are all valid and have increasing block IDs. Afterwards, a block 0005 is read. Although the block 0005 is valid, its block ID does not increase as compared with the block ID of the previous data block 1001, and thus does not conform to a predetermined order. In this file, if no valid block whose block ID increases as compared with the block 1001 exists after the block 0005, it indicates that the data block 1001 previous to the block 0005 is a file end.

For the case (b) in which data blocks are of a fixed length and there is a damaged data block, when data blocks in the file are successively read until a data block 1001, these read data blocks are all valid and have increasing block IDs. Afterwards, an invalid block or a valid data block whose block ID does not increase is read. In this file, if at least one valid block 1003 whose block ID increases as compared with the block 1001 exists after this invalid block, it indicates that the file has been damaged.

For the case (c) in which data blocks are of variable lengths and there is no damaged data block, when data blocks in the file are successively read until a data block 1001, these read data blocks are all valid and have increasing block IDs. Afterwards, a block 0006 is read (a block head of a block 0005 has been at least partially overwritten by the block 1001). Although the block 0006 is valid, its block ID does not increase as compared with the block ID of the previous data block 1001, and thus does not conform to the predetermined order. In this file, if no valid block whose block ID increases as compared with the block 1001 exists after the block 0006, it indicates that the data block 1001 previous to the block 0006 is a file end.

For the case (d) in which data blocks are of variable lengths and there is a damaged data block, when data blocks in the file are successively read until a data block 1001, these read data blocks are all valid and have increasing block IDs. Afterwards, an invalid block or a valid data block whose block ID does not increase is read. In this file, if at least one valid block 1003 whose block ID increases as compared with the block 1001 exists after this invalid block/this data block whose block ID does not increase, it indicates that the file has been damaged.

It can be understood that, although different embodiments are described by using a log, a database, or a data file as an example of a data unit herein, the present disclosure is not limited to a file reading-writing scenario and various reusable data units are also applicable to the present application. Likewise, although different embodiments are described by using a disk as a position for storing the data units herein, the present disclosure is not limited to a disk reading-writing scenario and various storage manners are also applicable to the present disclosure.

In the present disclosure, the term "or" has an inclusive rather than exclusive meaning. That is, unless otherwise indicated or clearly seen from the context, using "A" or "B" as a phrase "X" is intended to cover any natural collocation. That is, the using "A" or "B" as the phrase "X" can be realized by any of the following instances: using A as X, using B as X, or using a combination of A and B as X. The terms "connection" and "coupling" may have the same meaning, which indicates that two devices are electrically connected. In addition, the articles "a," "an" and "the" used in the present disclosure and the appended claims should generally be understood as "one or more," unless it is otherwise stated or clearly seen from the context that they indicate singular forms.

Various aspects or features are presented in the form of a system that can include several apparatuses, components, modules, and other similar objects. It should be understood and appreciated that various systems may include additional apparatuses, components, modules, etc., and/or may not include all the apparatuses, components, modules, etc. discussed with reference to the accompanying drawings. A combination of all the means may also be used.

Various illustrative logics, logic blocks, modules, and circuits described with reference to the embodiments disclosed herein can be implemented or executed by using a general-purpose processor, a digital signal processor (DSP), an ASIC, a FPGA or another programmable logic device, a discrete gate or a transistor logic, a discrete hardware component, or any combination designed to implement functions of the present disclosure. The general-purpose processor may be a microprocessor. In some embodiments, the processor may be any conventional processor, controller, microcontroller, or state machine. The processor may also be implemented as a combination of computing devices, such as a combination of a DSP and a microprocessor, multiple microprocessors, one or more microprocessors in conjunction with the DSP core, or any other similar configuration. In addition, at least one processor may include one or more modules used to perform one or more steps and/or actions described above. For example, the foregoing embodiments described by using different methods can be implemented by a processor and a memory coupled to the processor. The processor can be configured to perform any step of any method described above or any combination of the steps.

Moreover, steps and/or actions of the methods or algorithms described with reference to the aspects disclosed herein can be directly implemented in hardware, a software module executed by the processor, or a combination of the two. For example, the foregoing embodiments described by using different methods can be implemented by using a computer readable medium storing computer program codes. The computer program codes, when executed by the processor/computer, perform any step of any method described above or any combination of the steps.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A data unit reuse method, wherein data is stored in a data unit in a form of a data block and the data block has a block ID, and the method comprises:
   successively reading each data block in a current data unit to search for a first specific data block whose block ID does not conform to a predetermined order;
   determining whether at least one data block whose block ID conforms to the predetermined order exists after the specific data block in the current data unit;
   when at least one data block whose block ID conforms to the predetermined order exists after the specific data block in the current data unit, determining that the current data unit has been damaged, and
   when no data block whose block ID conforms to the predetermined order exists after the specific data block in the current data unit, determining that a data block immediately previous to the specific data block is a data end.

2. The method of claim 1, wherein:
   the predetermined order comprises an increasing order or a decreasing order; and
   block IDs of continuous data blocks comprise continuous block IDs or discontinuous block IDs.

3. The method of claim 1, wherein:
   reuse of a data unit comprises reuse of multiple data units, and the current data unit comprises a latest data unit in the multiple data units.

4. The method of claim 3, wherein successively reading each data block in a current data unit to search for a first specific data block whose block ID does not conform to a predetermined order further comprises:
   acquiring a block ID of a last block written into a data unit immediately previous to the current data unit as an initial ID; and
   based on the initial ID, successively reading each data block in the current data unit to search for the first specific data block whose block ID does not conform to the predetermined order.

5. The method of claim 1, wherein the data block further comprises check data, and successively reading each data block in a current data unit further comprises: checking each data block based on the check data so as to determine whether the data block is a valid data block, and when the data block is an invalid data block, determining the data block as the first specific data block whose block ID does not conform to the predetermined order.

6. The method of claim 1, wherein the data unit is at least one of a file, a log, or a database.

7. The method of claim 1, wherein the data block is a fixed-length data block or a variable-length data block.

8. A data unit reuse apparatus, wherein data is stored in a data unit in a form of a data block and the data block has a block ID, and the apparatus comprises:

a memory; and a processor, coupled to the memory and configured to:
successively read each data block in a current data unit to search for a first specific data block whose block ID does not conform to a predetermined order;
determine whether at least one data block whose block ID conforms to the predetermined order exists after the specific data block in the current data unit;
when at least one data block whose block ID conforms to the predetermined order exists after the specific data block in the current data unit, determine that the current data unit has been damaged, and
when no data block whose block ID conforms to the predetermined order exists after the specific data block in the current data unit, determine that a data block immediately previous to the specific data block is a data end.

9. The apparatus of claim 8, wherein:
the predetermined order comprises an increasing order or a decreasing order; and
block IDs of continuous data blocks comprise continuous block IDs or discontinuous block IDs.

10. The apparatus of claim 8, wherein:
reuse of a data unit comprises reuse of multiple data units, and the current data unit comprises a latest data unit in the multiple data units.

11. The apparatus of claim 10, wherein the processor being configured to successively read each data block in a current data unit to search for a first specific data block whose block ID does not conform to a predetermined order comprises the processor being configured to:
acquire a block ID of a last block written into a data unit immediately previous to the current data unit as an initial ID; and
based on the initial ID, successively read each data block in the current data unit to search for the first specific data block whose block ID does not conform to the predetermined order.

12. The apparatus of claim 8, wherein the data block also comprises check data, and the processor being configured to successively read each data block in a current data unit further comprises the processor being configured to: check each data block based on the check data so as to determine whether the data block is a valid data block, and when the data block is an invalid data block, determine the data block as the first specific data block whose block ID does not conform to the predetermined order.

13. The apparatus of claim 8, wherein the data unit is at least one of a file, a log, or a database.

14. The apparatus of claim 8, wherein the data block is a fixed-length data block or a variable-length data block.

15. A non-transitory computer-readable storage medium having stored therein instructions that, when executed by a processor of a device, cause the device to perform a data unit reuse method, wherein data is stored in a data unit in a form of a data block and the data block has a block ID, and the method comprises:
successively reading each data block in a current data unit to search for a first specific data block whose block ID does not conform to a predetermined order;
determining whether at least one data block whose block ID conforms to the predetermined order exists after the specific data block in the current data unit;
when at least one data block whose block ID conforms to the predetermined order exists after the specific data block in the current data unit, determining that the current data unit has been damaged, and
when no data block whose block ID conforms to the predetermined order exists after the specific data block in the current data unit, determining that a data block immediately previous to the specific data block is a data end.

16. The non-transitory computer-readable storage medium of claim 15, wherein:
the predetermined order comprises an increasing order or a decreasing order; and
block IDs of continuous data blocks comprise continuous block IDs or discontinuous block IDs.

17. The non-transitory computer-readable storage medium of claim 15, wherein:
reuse of a data unit comprises reuse of multiple data units, and the current data unit comprises a latest data unit in the multiple data units.

18. The non-transitory computer-readable storage medium of claim 17, wherein successively reading each data block in a current data unit to search for a first specific data block whose block ID does not conform to a predetermined order further comprises:
acquiring a block ID of a last block written into a data unit immediately previous to the current data unit as an initial ID; and
based on the initial ID, successively reading each data block in the current data unit to search for the first specific data block whose block ID does not conform to the predetermined order.

19. The non-transitory computer-readable storage medium of claim 15, wherein the data block further comprises check data, and successively reading each data block in a current data unit further comprises: checking each data block based on the check data so as to determine whether the data block is a valid data block, and when the data block is an invalid data block, determining the data block as the first specific data block whose block ID does not conform to the predetermined order.

20. The non-transitory computer-readable storage medium of claim 15, wherein the data unit is at least one of a file, a log, or a database.

* * * * *